United States Patent Office 3,269,191
Patented August 30, 1966

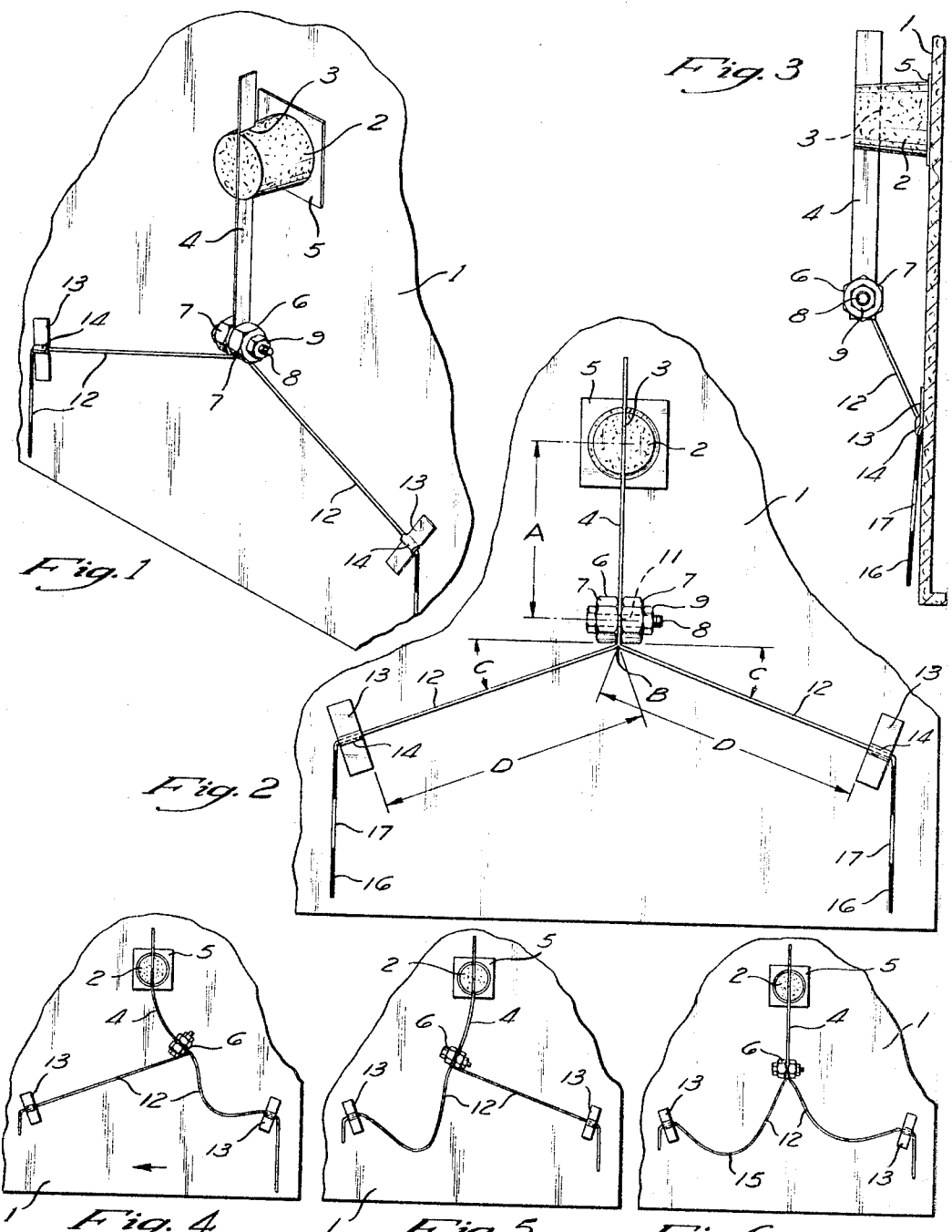

3,269,191
ACCELERATION MEASUREMENT APPARATUS
Lawrence C. Simmons, Cleveland, Ohio, assignor to Cleveland Technical Center, Inc., Cleveland, Ohio, a corporation of Delaware
Filed Apr. 13, 1964, Ser. No. 359,041
10 Claims. (Cl. 73—492)

This invention relates to the measurement and recording of accelerations, and more particularly to apparatus for measuring sudden accelerations, such as shocks, and making a record of them. As used herein, the word "acceleration" is intended to mean rate of change of velocity, whether the velocity is increasing or decreasing.

While the invention may be employed for measuring and recording accelerations of various bodies, it will be discussed below in the measurement and recording of shocks to which packages are subjected in shipment on ground vehicles such as railroad cars or highway trucks, and shocks to which such vehicles are subjected. For example, it is often desired in railway operations to measure and record shocks to which packages are subjected during the handling of cars from a receiving yard to an outbound track or vice versa. For maximum benefit, shocks should be measured on packages in each car being handled; with long trains of 100 cars or more it has heretofore been impossible to do this economically. The present practice has been to saturate the receiving yard with personnel, whose purpose is to try to time the speed of car impacts. This approach leaves a great deal to be desired. It provides only a statistical yardstick for classification yard impacts; impacts due to take-up of slack, impacts due to doubling the train, starting and stopping on the hump, and remaking the trains from the classification tracks have been impossible to measure in this manner.

It is often desirable, in connection with possible claims, to record the maximum shock to which a car or a package in the car was subjected during travel over shipping route to destination. Also, a shipper or carrier may wish to know the locations where the shock would be least in a car or truck, to permit fragile items to be located there in loading. The carrier or shipper may wish to check packing arrangements which might decrease shocks by measuring and recording shocks at different locations. As another example, it might be desired to check various package designs or loading arrangements by shock recorders. However, available instruments for attachment to each vehicle for automatically measuring and recording shocks, have been too expensive for large scale use. Furthermore, it is often desired to use shock recorder apparatus that is so inexpensive that it can be attached to a package at shipping point, read at destination, and discarded.

An object of the present invention, therefore, is the provision of shock measuring and recording apparatus that is satisfactorily accurate, that makes and maintains until reset a record of the maximum shock imposed upon the item on which the apparatus is mounted, that is simple in operation, that can be made at low cost, and that can be easily installed and readily read.

Other objects of the invention will become apparent from the following description of a preferred embodiment thereof in connection with the accompanying drawings in which:

FIGURE 1 is a perspective of shock recording apparatus embodying the invention shown as mounted on an item, such as a package, that is to be subjected to shocks the maximum shock of which is to be recorded, the parts of the apparatus being shown in position before being subjected to shock;

FIGURE 2 is a front elevation of the apparatus before being subjected to shock;

FIGURE 3 is a side elevation of the apparatus;

FIGURE 4 illustrates the conditions that occur when the item to which the apparatus is attached is subjected to a shock in the direction of the arrows;

FIGURE 5 illustrates the condition that occurs on recoil; and

FIGURE 6 indicates the conditions after the apparatus is at rest after being subjected to the shock.

As shown in the drawings, the vertical wall 1 of the item which is expected to be subjected to the shock, such as the wall of a packaging carton or of a railroad car, has mounted thereon a supporting member 2 taking the form of a large conventional cork of the type available for stopping bottles or the like. This member 2 is slotted at 3 and rigidly supports therein the upper end portion of a metal leaf spring 4, the compressive forces resulting from the natural resilience of the material of member 2 firmly holding the upper end of the spring 4 in member 2. While the supporting member 2 may be formed of various materials, it conveniently and preferably is formed of natural cork material. Member 2 is held in place on the wall 1 by a piece of pressure-sensitive adhesive tape 5 that is coated with pressure-sensitive adhesive on both faces. Supporting member 2 is installed by merely manually pressing it against the wall 1 with the adhesive material 5 located between the member 2 and the wall 1, the holding power of the adhesive material and the weight of the parts supported thereby being so related that the structure is firmly supported on package wall under all vibration and shock conditions to which the wall may be subjected.

The lower end of the leaf spring 4 rigidly carries a weight 6 that in the illustrated appartus comprises two large steel nuts 7 clamped onto the lower end portion of spring 4 by a headed bolt 8 carrying a nut 9. Bolt 8 passes through an opening 11 in spring 4. The weight 6 clears the wall 1, as shown in FIGURE 3.

A flexible strand 12, of sufficient stiffness to prevent kinking of the strand but sufficient flexible to permit the strand to bend easily, is fixed at its midpoint to the underside of weight 6, as by being looped around bolt 8 and clamped between spring 4 and one of the large nuts 7.

As is apparent from FIGURES 1 and 2, the leaf spring 4 is mounted so that it is substantially vertical when the weight 6 is at rest. The strand 12 is slidably supported by brackets 13 located equidistantly on opposite sides of the spring. When the weight 6 is at rest and the apparatus is ready to measure and record a shock, the strand extends straight between each bracket member 13 and the spring 4, as shown in FIGURES 1 and 2. Brackets 13 are preferably formed of adhesive tape coated with pressure-sensitive adhesive material only on the face that is pressed against the wall 1. This adhesive tape of each bracket 13 is mounted so that its central portion 14 bulges outwardly to provide a passage through which the strand 12 can slide. Preferably, the inner face of this central portion of the tape is free of adhesive material, either because the strip was initially made with such an uncoated portion or because an additional strip of smooth-faced material has been adhered to the adhesive coating at such location to provide the desired non-adherent surface; alternatively, the tape of each bracket 13 can hold a tube, such as a piece of crushed soda straw, to provide the passage for the strand 12.

The brackets 13 are located on each side of the spring 4 at a distance somewhat greater than the maximum swing of the weight 6 when the apparatus is subjected to the largest shock expected, and preferably somewhat below the weight 6 so that the strand cannot become tangled with the weight when it swings, as shown in FIGURE 2. Furthermore, the length of strand 12 hanging down past each bracket 13, when the parts are at rest and the strand is straight between the weight 6 and the brackets, is sufficient to permit the weight to swing the maximum amount without pulling the strand 12 out of either bracket. The strand 12 is made of material that is limp enough so when it is pulled through a bracket 13 by swinging movement of weight 6 it will not push back through the bracket on recoil of the weight, but stiff enough so it will not kink. The strand 12 is held in brackets 13 with sufficient friction so vibrations will not cause the strand to pull out of the brackets 13 during transportation of the item to which the apparatus is fixed or to be pushed back through the brackets after it has been partially drawn through them by swinging of weight 6, but with insufficient friction substantially to impair the accuracy of indication of the apparatus.

The illustrated apparatus is used as follows: the parts are readily and quickly applied to the item the shock impact of which is to be recorded, as by assembling the supporting member 2 and weight 6 on the leaf spring 4 and fixing the strand 12 to the weight 6, and then pressing the supporting member 2 against the wall while the adhesive piece 5 is positioned between member 2 and wall 1, so supporting member 2 is firmly fixed on the wall. The brackets 13 are then mounted on the wall 1 in the proper measured horizontal positions relative to weight 6 when it is at rest, and the strand 12 is drawn through the brackets 13 so that lengths of the strand between the brackets and the stationary weight 6 are straight. The parts are then positioned as shown in FIGURES 1 and 2.

When the item, such as a package carton, having the wall 1 on which these parts are thus mounted, is subjected to a shock force in the direction indicated by the arrow in FIGURE 4, the resulting accelerated movement imparted to the support 2 causes the leaf spring 4 to deflect in a direction opposite to the direction of the shock by a maximum amount determined by the mass of the weight 6, the resiliency of the spring 4, and the distance between the weight 6 and the supporting member 2. The resulting generally arcuate movement of the weight 6, as shown in FIGURE 4, pulls a portion of the strand 12 through the bracket 13 away from which the weight 6 moves, for a length corresponding to the maximum amount that the weight 6 has moved in response to the shock. On recoil, the weight 6 moves a lesser amount in the opposite direction, as shown in FIGURE 5, pulling the other portion of the strand through the other bracket 13 for a smaller length. After the weight 6 is again at rest, the maximum length of strand 12 that has been pulled through either of the brackets 13, forming part of the large loop 15 of the strand shown in FIGURE 6, is an indication and record of the maximum shock to which the article was subjected.

By proper design of the parts, this maximum length of strand that has been drawn through a bracket 13 can constitute an accurate record of the maximum shock. If desired, as shown in FIGURE 2, the strand can be color coded in alternating, and preferably equal, short portions 16 and 17 of contrasting colors. While these portions can also serve as guides for locating the brackets 13 on wall 1 during installation of the apparatus, by proper selection of the proportions and weights of the parts and proper spacing of the color coded portions of the strand, it is possible to provide a record of the shock that can be read at a glance. The device can be readily reset by pulling out the slack in the cord to restore the parts to the relationship shown in FIGURES 1 and 2.

When there is a length of strand 12 slidably supported by a bracket 13 on each side of the weight 6 as in the illustrated embodiment, the apparatus can measure maximum shock in either direction along the plane of the surface 1, which is highly advantageous. However, a device embodying the invention may have a strand on only one side of the weight 6, in which case shock in only one direction can be measured and recorded.

An actual example of structure and use of apparatus embodying the invention is as follows. The supporting member 2 was a No. 20 cork, 1½" in maximum diameter and 1½" long, partially slit with a knife to provide slot 3. The spring 4 was a half length of a 12" long hacksaw blade about ½" wide. The adhesive member 5 was a piece of commercially available two-way pressure-sensitive adhesive fabric tape. The large nuts 7 were standard ½" internal diameter hexagonal steel nuts, clamped to the spring by a ¼" diameter bolt 8 that was 1¼" long passing through the lower end of the spring and carrying a ¼" internal diameter hexagonal nut 9. The weight 6, made up of nuts 7, bolt 8 and nut 9, weighed 2¾ ounces.

The distance A (FIGURE 2) between the bottom of the supporting member 2 and the centerline of bolt 8 was determined by holding by member 2, the assemblage made up of member 2, spring 4, and weight 6 in a horizontal position, and adjusting distance A until point B at the bottom of weight 6 deflected 3/16" from the horizontal; with the standard hacksaw blade used in the illustrative example distance A was 2⅞".

The strand 12 was a length of twisted light weight cotton fishing line 21" long, the center of which was clamped as indicated above between weight 6 and spring 4. The brackets 13, formed of ¼" wide adhesive tape pieces, from which the adhesive was absent in the central transverse portion, were mounted so that the angles C (FIGURE 2) were 20° from the horizontal and the distances D (FIGURE 2) were 6¾".

The apparatus was fixed to a portion of a freight car that was impacted at various speeds into a standing string of cars. The maximum length of strand 12 pulled through either bracket 13, which maximum length forms part of larger loop 15 (FIGURE 6), was as follows for the indicated speeds at impact, speeds being given in miles per hour:

| Speed (m.p.h.): | Increase in strand length (inches) |
|---|---|
| 4 | .37 |
| 5 | .62 |
| 6 | .88 |
| 7 | 1.19 |
| 8 | 1.38 |
| 9 | 1.65 |
| 10 | 1.88 |

Comparison of the indications of this apparatus with the indications provided by highly accurate instrumentation costing thousands of dollars indicated that this illustrative apparatus provided quite accurate, usable, recorded indications of shock when each ⅛" increase in the length 15 of strand 12 was considered to indicate a shock magnitude of 1g where g is the acceleration of gravity, or about 32.2 feet per second per second.

It is apparent that apparatus embodying the invention can have different proportions and dimensions than those disclosed. It is also apparent that apparatus of the invention can be manufactured and installed at a very low cost that will permit it to be discarded with little loss. Therefore, it is possible to store the parts of the disassembled device in a small space, withdraw the parts from inventory as required, install them on the article the shock of which is to be measured, ship the article, at the destination read the maximum shock to which the article has been subjected, and either remove and discard the parts of the apparatus, or remove and store them until it is convenient to ship or mail a number of them to a shipping point. Large numbers of these devices can be supplied and installed at low costs for the other testing or checking purposes indicated above; their low costs, accuracy and capability of being reset make them highly useful for such purposes.

Other modifications and advantages of the invention will be apparent to those skilled in the art. It is to be understood that my patent is not limited to the preferred form of the invention disclosed herein or in any manner other than by the scope of the appended claims.

I claim:

1. In a device of the character described, a support, a movable member, a leaf spring dependingly movably supporting said movable member from a fixed position on said support for movement in a generally arcuate path below said position, said leaf spring means biasing said movable member to an at-rest position but permitting movement of said movable member in response to acceleration to which said support is subjected from said at-rest position to a position spaced from said at-rest position by an amount determined by the magnitude of the acceleration, and a length of flexible strand fixed to said movable member and slidably carried by said support at a location thereon at the side of said movable member away from the direction in which said movable member moves in response to acceleration to which said support is subjected, so that when said member moves in response to acceleration the length of said strand between said movable member and said location increases to provide an indication of the magnitude of the acceleration.

2. The apparatus of claim 1 in which said strand contains markings thereon to facilitate measurement of the increase in length of said strand due to movement of said movable member.

3. In a device of the character described, a support, a movable member, a leaf spring mounted at a fixed position on said support and movably supporting said movable member for movement in a generally arcuate path below said position, said leaf spring biasing said movable member to an at-rest position below said position, but permitting movement of said movable member in response to acceleration to which said support is subjected from said at-rest position to a position spaced from said at-rest position by an amount determined by the magnitude of the acceleration, and a length of flexible strand fixed to said movable member and slidably carried by said support at locations on opposite sides of said movable member in the directions of its movement, so that when said movable member moves with respect to said support in response to acceleration the length of said strand increases between said movable member and the location on the side of said movable member away from the direction in which said member moves in response to said acceleration, said increase in length of said strand giving an indication of the magnitude of the acceleration.

4. The apparatus of claim 3 in which said strand contains markings thereon to facilitate measurement of the increase in length of said strand due to movement of said movable member.

5. In a device of the character described, a support, a movable member, a supporting member dependingly movably supporting said movable member from a fixed position on said support at a location above said movable member for movement of said movable member in a generally lateral path below said position so that said movable member is biased at least in part by gravity to an at rest position but permitted movement in response to acceleration to which said support is subjected from said at rest position to a position spaced from said at rest position by an amount determined by the magnitude of the acceleration, and a flexible strand fixed to said movable member and slidably carried by said support at a location thereon at the side of said movable member away from the direction in which said movable member moves in response to acceleration to which said support is subjected, so that when said member moves in response to acceleration the length of said strand between said movable member and said location irreversibly increases to provide an indication of the magnitude of the acceleration after the acceleration ceases.

6. The apparatus of claim 5 in which said strand contains markings thereon to facilitate measurement of the increase in length of said strand due to movement of said movable member.

7. The apparatus of claim 5 in which said supporting member is a spring member.

8. The apparatus of claim 7 in which said supporting member is a spring member.

9. In a device of the character described, a support, a movable member, a supporting member dependingly movably supporting said movable member from a fixed position on said support at a location above said movable member for movement of said movable member in a generally lateral path below said position so that said movable member is biased at least in part by gravity to an at rest position but permitted movement in response to acceleration to which said support is subjected from said at rest position to a position spaced from said at rest position by an amount determined by the magnitude of the acceleration, and flexible strands connected to said movable member and slidably carried by said support at locations on opposite sides of said movable member in the directions of its movement, so that when said movable member moves with respect to said support in response to accelerations the length of strand irreversibly increases between said movable member and the location on the side of said movable member away from the direction in which said movable member moves in response to said acceleration, said increase in length of said strand providing an indication of the magnitude of the acceleration after the acceleration ceases.

10. The apparatus of claim 9 in which at least one of said strands contains markings thereon to facilitate measurement of the increase in length of said strand due to movement of said movable member.

References Cited by the Examiner

UNITED STATES PATENTS

| 1,947,260 | 2/1934 | Hall et al. | 73—321 |
| 2,601,440 | 6/1952 | Kerrigan | 73—492 X |
| 2,726,075 | 12/1955 | Hosford | 73—489 |
| 3,117,455 | 1/1964 | Shepherd | 73—492 |
| 3,140,910 | 7/1964 | Duke et al. | |

FOREIGN PATENTS 798,648    3/1936    France.

RICHARD C. QUEISSER, *Primary Examiner.*

JAMES J. GILL, *Examiner.*